United States Patent
Koshikawa et al.

[11] 3,918,025
[45] Nov. 4, 1975

[54] ULTRASONIC IMAGING APPARATUS FOR THREE-DIMENSIONAL IMAGE DISPLAY

[75] Inventors: Tsuneji Koshikawa, Sayama; Kageyoshi Katakura, Tokyo; Masaharu Kobayashi, Hachioji; Yasuaki Tannaka, Tokyo, all of Japan

[73] Assignee: Hitachi, Ltd., Japan

[22] Filed: July 15, 1974

[21] Appl. No.: 488,440

[30] Foreign Application Priority Data
July 25, 1973    Japan............................ 48-83126

[52] U.S. Cl.............. 340/1 R; 73/67.7; 73/67.8 S; 340/3 FM; 340/5 MP
[51] Int. Cl.² ......................................... G01S 9/66
[58] Field of Search...... 340/1 R, 3 FM, 5 MP, 5 H; 73/67.8 S, 67.7, 67.9

[56] References Cited
UNITED STATES PATENTS
| | | | |
|---|---|---|---|
| 3,016,513 | 1/1962 | VanDyke | 340/3 FM |
| 3,419,845 | 12/1968 | Thiede et al. | 340/3 FM |
| 3,685,051 | 8/1972 | Wells | 340/5 H |

*Primary Examiner*—Richard A. Farley
*Attorney, Agent, or Firm*—Craig & Antonelli

[57] ABSTRACT

An improved ultrasonic imaging apparatus utilizing ultrasonic waves for obtaining an image of a target object which comprises a transmitting transducer radiating ultrasonic waves whose direction of radiation varies depending on the input frequency, a receiving transducer receiving reflected acoustic waves from a target plane, a frequency analyzer converting the output signal of the receiving transducer into a signal representing the position of the target plane on the basis of the frequency and the position of the received acoustic waves on the receiving transducer, and an image display unit displaying the output signal of the frequency analyzer. In the apparatus, in order to obtain a three-dimensional image including depthwise image information in addition to plane image information of the target object, the frequency analyzer is constructed so that a plurality of image information successively obtained from a plurality of target planes of different depths can be converted into signals representative of different depths to be displayed in superposed relation on the display unit.

8 Claims, 7 Drawing Figures

ULTRASONIC IMAGING APPARATUS FOR THREE-DIMENSIONAL IMAGE DISPLAY

BACKGROUND OF THE INVENTION

1. Field of the Invention

This invention relates to an apparatus for detecting the configuration of a target object existing in an environment such as muddy water which cannot be observed with light. More particularly, the present invention relates to an apparatus which utilizes ultrasonic waves for detecting the configuration of a target object in the horizontal and vertical directions plus the depthwise direction to obtain a three-dimensional image of the target object.

2. Description of the Prior Art

Methods of obtaining a two-dimensional image of a target object existing in, for example, muddy water have already been developed. In these methods, such a two-dimensional image is obtained by acoustic waves reflected from a specific target plane, that is, a section substantially orthogonal to the direction of propagation of acoustic waves.

The present inventors have invented an ultrasonic imaging apparatus as disclosed in the U.S. Pat. No. 3,794,964. According to this ultrasonic imaging apparatus, a frequency sweep wave signal is applied to a transmitting transducer which radiates ultrasonic waves the direction of radiation of which varies in one direction, for example, in a horizontal direction depending on the input frequency so that plane waves whose direction of radiation varies depending on the frequency change can be directed toward a target plane of a target object. A receiving transducer receives reflected acoustic waves appearing as a result of irradiation of the target object, hence the target plane, with the ultrasonic waves. The positions from which the received acoustic waves are reflected from the target plane are discriminated on the basis of the frequency of the transmitted acoustic waves and position information on the receiving transducer, and information representing the relative intensities of the received acoustic waves at the discriminated positions are displayed on a display means to obtain a target object image.

However, the ultrasonic imaging apparatus above described is only capable of picking up the image of a target object in a section or plane which is substantially orthogonal to the direction of radiation of acoustic waves and which lies at a point remote by a predetermined distance from the transmitting and receiving transducers. Further, this distance must be changed to another predetermined value when it is desired to observe or pick up the image of the target object in another target plane, and thus it is unable to simultaneously observe a plurality of sections or planes at different distances.

A target object is commonly in the form of a three-dimensional body. Even when a target object is in the form of a planar body, the surface thereof is not necessarily orthogonal to the direction of propagation of acoustic waves, and in many cases, the surface makes an inclination relative to the direction of propagation of acoustic waves. The two-dimensional imaging system above described is defective in that only a part of the target object is observed in such a case and the overall configuration of the target object cannot be detected.

SUMMARY OF THE INVENTION

An object of the present invention is to provide an improved ultrasonic imaging apparatus which can obtain a three-dimensional reflected image of a target object by detecting position information of the target object in a depthwise direction in addition to position information in a vertical and a horizontal direction.

Another object of the present invention is to provide an ultrasonic imaging apparatus which utilizes ultrasonic waves for obtaining such a three-dimensional image of a target object.

Still another object of the present invention is to provide an ultrasonic imaging apparatus which utilizes ultrasonic waves for obtaining such a three-dimensional image of a target object and displays this image on a two-dimensional planar display means.

In order to accomplish such objects, the present invention provides an ultrasonic imaging apparatus which comprises a transmitting transducer for radiating ultrasonic waves whose direction of radiation varies depending on the driving or input frequency, a receiving transducer composed of a plurality of electroacoustic transducing members for receiving reflected acoustic waves from a target object when a beam of ultrasonic waves is radiated from the transmitting transducer toward the target object for scanning the target object in one direction, and a frequency analyzer for analyzing the frequency of the electrical signal delivered from the receiving transducer to discriminate the reflecting positions in one direction of a target plane on the basis of the frequency and to discriminate the reflecting positions in the other direction of the target plane on the basis of the positions of the wave receiving members in the receiving transducer so that the image of the target object can be obtained by the reflected acoustic waves from the positions determined by the above manner of discrimination in the two directions, wherein the frequency analysis by the frequency analyzer is carried out at a predetermined time interval to coincide with the time of arrival of the reflected acoustic waves from a plurality of target planes spaced apart by a predetermined distance from each other in the depthwise direction of the target object so as to obtain a plurality of two-dimensional acoustic images at different depths of the target object and to display such acoustic images in superposed relation on a display means for displaying a three-dimensional image of the target object.

Other objects and various additional features and advantages of the present invention will become apparent from the following detailed description of the illustrative embodiment thereof taken in conjunction with the accompanying drawings.

DESCRIPTION OF THE PREFERRED EMBODIMENT

Figure 1:
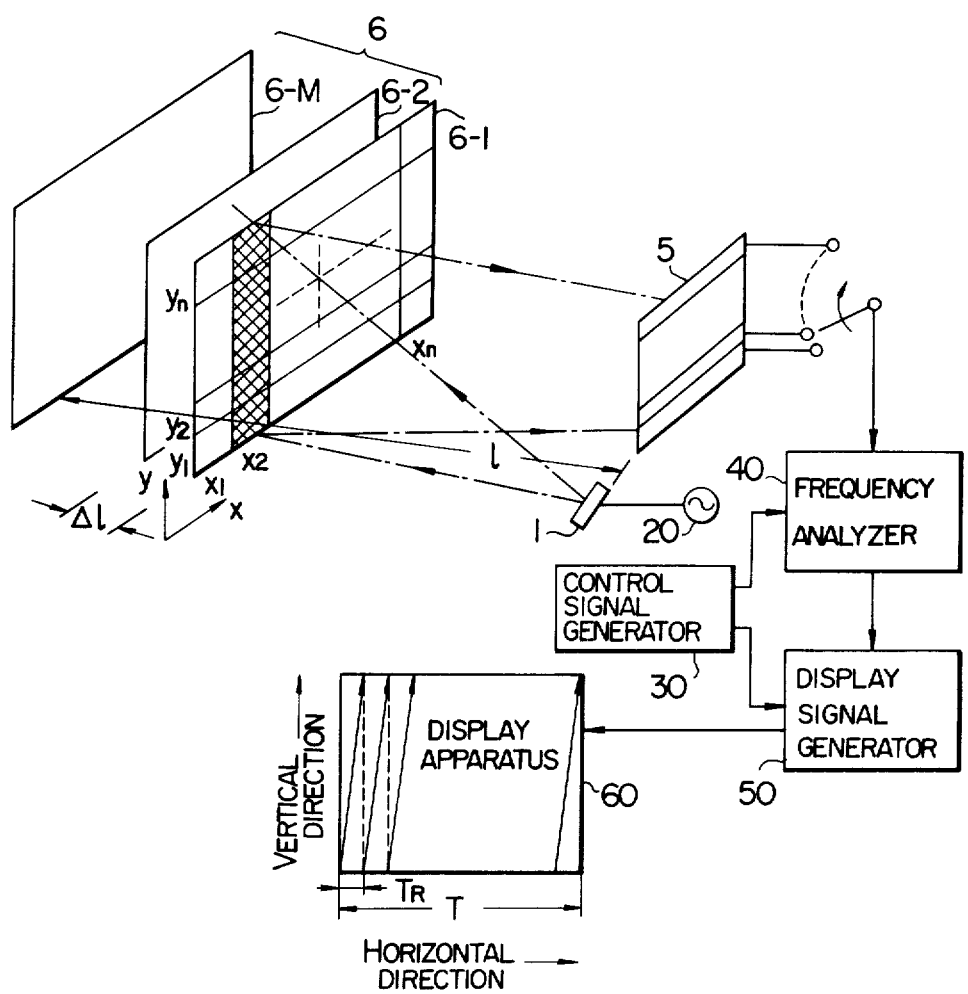
FIG. 1 is a block diagram for illustrating the basic principle of the present invention.

Referring to FIG. 1, it is supposed that a target object 6 includes a plurality of target planes 6-1, 6-2, . . . 6-M each extending in a two-dimensional fashion in the directions of the X-axis and the Y-axis. A transmitting transducer 1 radiates acoustic waves or ultrasonic waves (hereinafter referred to generally as ultrasonic waves) diverging in the direction of the Y-axis. An electrical signal source 20 generates an electrical signal of varying frequency so that, in response to variations in the frequency of this signal, the direction of the ultrasonic waves radiated from the transmitting transducer 1 can be varied in the direction of X-axis. A receiving transducer 5 is composed of a plurality of receiving members arrayed in the direction of Y-axis and receives the ultrasonic waves reflected from the target planes 6-1 to 6-M to convert the reflected ultrasonic waves into electrical signals. A frequency analyzer 40 analyzes the frequency of the output signals of the receiving transducer 5 to derive necessary frequency components. A display signal generator 50 converts the output signals of the frequency analyzer 40 into signals suitable for display on a display apparatus 60 as described later. A control signal generator 30 supplies control signals required for the control of the frequency analyzer 40 and display signal generator 50.

The parts for picking up the image from only one of the target planes 6-1 to 6-M in the apparatus of the present invention are substantially the same as those in the apparatus disclosed in the U.S. Pat. No. 3,794,964. However, the present invention differs from the cited patent in that a plurality of images picked up from the target planes 6-1, 6-2, . . . , 6-M are displayed in superposed relation on the display apparatus 60 in such a manner that the relative remoteness of these images can be discriminated.

For a better understanding of the present invention, image pick-up operation for one of the target planes, for example, the target plane 6-1 will be first described before giving detailed description of the present invention.

Figure 2:
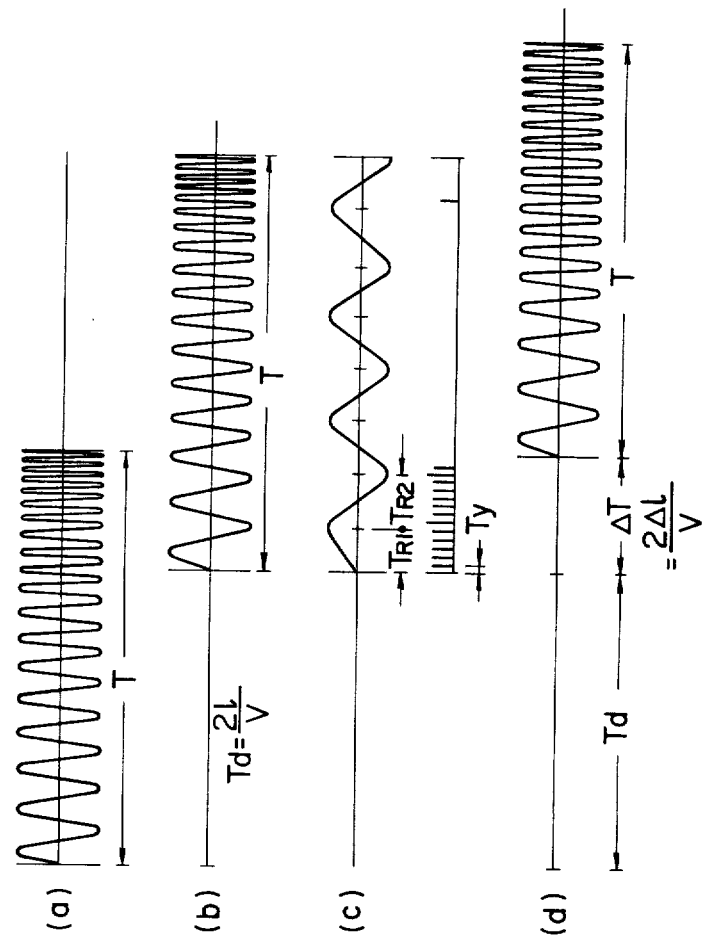
FIG. 2 is a time chart for illustrating the operation of the arrangement shown in FIG. 1.

FIG. 2 including waveforms $(a)$ to $(d)$ is a time chart for illustrating the operation of the arrangement shown in FIG. 1. A signal whose frequency varies relative to time as shown in waveform $(a)$ is applied to the transmitting transducer 1. When such signal is applied to the transmitting transducer 1 which radiates ultrasonic waves, a reflected signal having a frequency variation as shown in waveform $(b)$ appears from the receiving transducer 5. It will be seen that the signal shown in $(b)$ is delayed relative to the signal shown in $(a)$ by a period of time $Td = 2l/V$ required for wave transmission and reception, where $l$ is the distance between the target plane 6-1 and the transmitting and receiving transducers 1 and 5, and $V$ is the velocity of ultrasonic waves. When a signal having a slight frequency difference $\Delta F$ from the frequency of the signal shown in waveform $(b)$ is added to the signal shown in $(b)$, the resultant signal includes the component $\Delta F$. Then, when this signal is passed through a band-pass filter which permits passage of the frequency $\Delta F$, a signal consisting solely of $\Delta F$ as shown in $(c)$ is obtained. This is the signal component including solely the signal reflected from the target plane 6-1. When the frequency changing period of time T is selected to be equal to the horizontal scanning period of the display apparatus 60 shown in FIG. 1 and the period of time $T_R$ required for scanning all the members of the receiving transducer 5 is selected to be equal to the vertical scanning period $T_R$ of the display apparatus 60, it will be seen that the signal shown in $(c)$ represents the image signal of the target plane 6-1.

In the apparatus according to the present invention, similar image signals are obtained from the remaining target planes 6-2, 6-3, . . . , 6-M to be displayed on the display apparatus 60 in superposed relation. For example, as shown in $(d)$ the period of time required for the reception of a signal reflected from the target plane 6-2 and received by the receiving transducer 5 is longer by $\Delta T$ than that of the signal shown in $(b)$. That is, this signal is delayed by $\Delta T = 2\Delta l/V$ relative to the signal shown in $(b)$, where $\Delta l$ is the distance between the target planes 6-1 and 6-2. Therefore, the image signal of the target plane 6-2 can be obtained by adding a signal having a frequency difference $\Delta F$ to the received signal shown in $(d)$ in synchronism with such received signal and subjecting the resultant signal to heterodyne detection. The image signals of the individual target planes obtained in the manner above described are displayed in superposed relation on the same display surface of the display apparatus 60 while being distinguished from one another by different brightnesses, different colors or the like to display a three-dimensional image of the target object.

Figure 3:
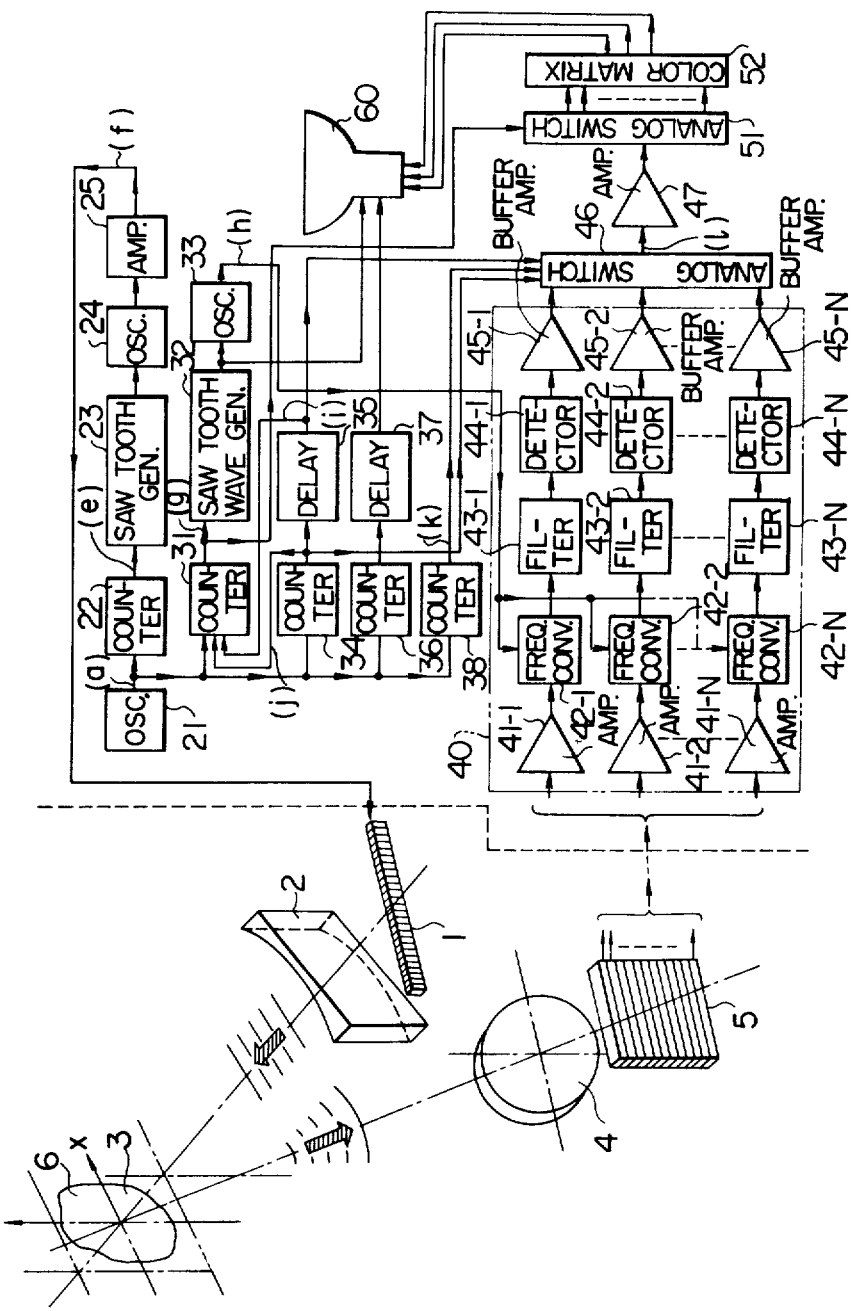
FIG. 3 is a block diagram showing the construction of one embodiment of the ultrasonic imaging apparatus according to the present invention.
Figure 4:
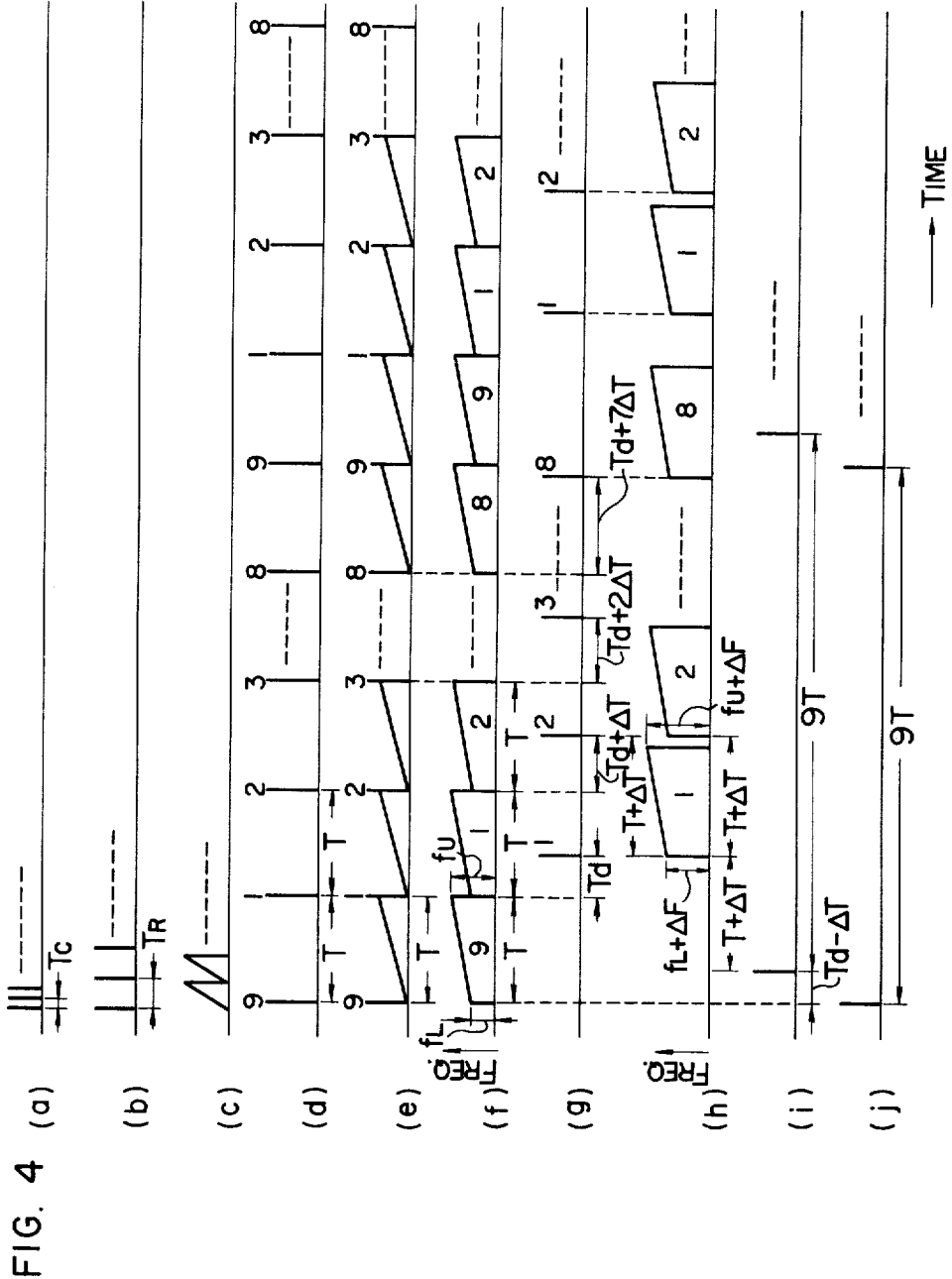
FIG. 4 is a time chart for illustrating the operation of the embodiment shown in FIG. 3.

The present invention will now be described in detail with reference to FIGS. 3 to 7. FIG. 3 is a block diagram showing the construction of one embodiment of the ultrasonic imaging apparatus according to the present invention, and FIG. 4 is a time chart for illustrating the operation of the embodiment shown in FIG. 3.

Referring to FIG. 3, a clock pulse generator 21 generates a clock signal output which controls the timing relation in the operation of the ultrasonic imaging apparatus. The pulses in this clock signal have a pitch interval $T_c$ as shown in $(a)$ of FIG. 4. A counter 22 generates a pulse signal having a period T as shown in $(d)$ of FIG. 4. It will be seen in the signal $(d)$ of FIG. 4 that one pulse is generated when $T/T_c$ pulses of the clock signal output of the clock pulse generator 21 are counted by the couter 22. The signal shown in $(d)$ of FIG. 2 is applied as a trigger signal to a saw-tooth wave generator 23 which generates a saw-tooth wave signal as shown in $(e)$ of FIG. 2. The voltage value of this saw-tooth wave signal is then converted by a voltage controlled oscillator 24 into a frequency sweep wave signal having a period T as shown in $(f)$ of FIG. 4. In $(f)$ of FIG. 4, the vertical axis represents the frequency, and the frequency sweep range is from $f_L$ to $f_U$. This frequency sweep wave signal is applied to a transmitting transducer 1 through a power amplifier 25 and is converted into an ultrasonic wave signal to be directed toward a target object 6. The direction of the ultrasonic waves radiated from the transmitting transducer 1 is variable in one direction depending on the frequency variation within the range of $f_L$ to $f_U$. This direction is variable, for example, in a horizontal direction. This transmitting transducer 1 has such a construction that a number of transmitting members of electrostrictive or any other suitable material are rectilinearly arrayed in a predetermined direction and the directions of polarization of the individual transmitting members are selected so that the direction of polarization of one transmitting member differs by, for example, 180° from that of the adjacent transmitting members.

In response to the application of the frequency sweep wave signal to this transmitting transducer 1, plane ultrasonic waves are radiated in which the direction of radiation varies depending on the frequency variation. These ultrasonic waves are converged by a plano-concave acoustic lens 2 into a so-called sectoral beam (fan shape beam) of ultrasonic waves and this beam is irradiated on the target object 6. Acoustic waves reflected from a predetermined target plane of the target object 6 pass through an acoustic lens 4 to be focussed on a receiving transducer 5. Thus, the acoustic waves corresponding to the reflected image of the target object 6 are applied to the receiving transducer 5. This receiving transducer 5 is composed of a number of receiving members arrayed in a predetermined direction so that the points of reflection in the vertical direction of the target object 6 can be discriminated by the positions of the individual receiving members.

The practical structure and operation of the transmitting transducer 1, acoustic lenses 2 and 4 and receiving transducer 5 are described in detail in the U.S. Pat. No. 3,794,964 of the present inventors cited hereinbefore and any detailed description as to such parts will be omitted.

Suppose now that the number of the receiving members constituting the receiving transducer 5 is N. The outputs of the N receiving members constituting the receiving transducer 5 are applied to an N-channel heterodyne frequency analyzer 40. This frequency analyzer 40 is composed of N pre-amplifiers 41-1 to 41-N corresponding to the N respective members constituting the receiving transducer 5, N frequency converters 42-1 to 42-N, N band-pass filters 43-1 to 43-N, N envelope detectors, 44-1 to 44-N, and N buffer amplifiers 45-1 to 45-N. An analog switch circuit 46 is provided to sequentially change over the N parallel outputs of the frequency analyzer 40 so as to convert such outputs into a time serial signal.

A local oscillator applies its output to the heterodyne frequency analyzer 40 in order to make possible the obtaining of a three-dimensional image. To this end, a counter 34 shown in FIG. 3 is connected to the clock pulse generator 21 to produce a pulse signal having a period (M + 1) T as shown in (j) of FIG. 4, where M is the number of target planes, hence the number of steps in the depthwise direction and is herein supposed to be eight for convenience. Thus, the pulse signal appearing from the counter 34 has a period 9T as shown. Each pulse in this pulse signal is used as a reset pulse for a counter 31. A delay circuit 35 is connected to the counter 34 to delay the pulse signal output of the counter 34 by a period of time of $Td - \Delta T$, where $\Delta T$ is equal to the period of time required for acoustic waves to travel back and forth the unit step distance in the depthwise direction. Diagram (i) of FIG. 4 shows such a pulse signal appearing from the delay circuit 35, and it is apparent that the period of this pulse signal is also 9T. These pulses are used as set pulses for the counter 31 shown in FIG. 3.

The clock pulse signal having the period $T_c$ is applied to the counter 31 which is set by the set pulse shown in (i) of FIG. 4 and reset by the reset pulse shown in (j) of FIG. 4. Thus, a pulse signal having a period $T + \Delta T$ as shown in (g) of FIG. 4 appears from the counter 31. This pulse signal is used to trigger a saw-tooth wave generator 32 to obtain a saw-tooth voltage waveform which is applied to a voltage controlled oscillator 33 to obtain a frequencyسسweep wave signal as shown in (h) of FIG. 4. The frequency range of this sweep wave signal is from $f_L + \Delta F$ to $f_U + \Delta F$, where $f_L$ and $f_U$ are the lower and upper limits respectively of the frequency sweep wave signal appearing from the oscillator 24. The frequency sweep wave signal shown in (h) of FIG. 4 is used as a local oscillation signal applied to the heterodyne frequency analyzer 40.

It will be apparent from FIG. 4 that the depth specifying local oscillation signals 1, 2, . . . 8 shown in (h) appear successively with respective delay times of $Td$, $Td + \Delta T$, $Td + 2\Delta T$, . . . $Td + 8\Delta T$ relative to the individual wave transmitting signals 1, 2, . . . 8 shown in (f). Therefore, the acoustic waves reflected successively from the target planes spaced apart from each other by the distance corresponding to the delay time $\Delta T$ are successively received by the receiving transducer 5.

The reset pulse shown in (j) of FIG. 4 must appear after the appearance of the trigger pulse corresponding to the last step among the trigger pulses applied to the saw-tooth wave generator 32 to obtain the local oscillation signal from the oscillator 33. This specific trigger pulse is the Mth pulse due to the fact that the number of steps is M. Thus, the following relation must hold:

$$M(T + \Delta T) + Td - \Delta T < 9T$$

Therefore, the following relation is obtained:

$$(M - 1)\Delta T + Td < T \tag{1}$$

Further, due to the fact that the time interval between the reset pulse and the set pulse is $Td - \Delta T$ and the set pulse must appear after the appearance of the reset pulse, the following relation must hold:

$$Td > \Delta T \tag{2}$$

It is therefore necessary that $\Delta T$ corresponding to the unit distance between the steps, $Td$ corresponding to the distance between the transmitting and receiving transducers 1 and 5 and the nearest target plane, and T corresponding substantially to the frame period be selected so as to satisfy both the relations (1) and (2).

It will thus be seen that the frequency difference between the reflected acoustic wave signal and the local oscillation signal can be always maintained at $\Delta F$ only when the output signals of the receiving transducer 5 are applied to the frequency analyzer 40 with the timing of the waveform shown in (h) of FIG. 4, or in other words, only when the reflected acoustic waves arrive from successive positions of the target object which positions are spaced apart from each other by a distance of $V \cdot \Delta T/2$ where $V$ is the velocity of acoustic waves. Further, the so-called heterodyne frequency analysis can be attained when the center frequency of all the band-pass filters 43-1 to 43-N in FIG. 3 is selected to be $\Delta F$. Consequently, in response to the application of the local oscillation signals 1, 2, . . . 8 shown in (h) of FIG. 4, analyzed outputs corresponding to the reflected acoustic waves from the eight positions or steps in the depthwise direction can be obtained since M is selected to be 8.

Figure 5:
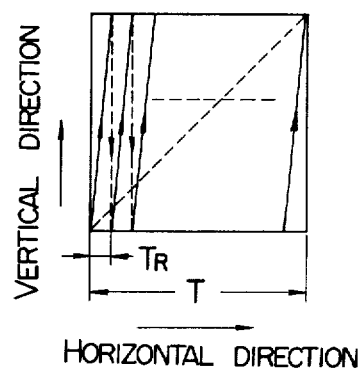
FIG. 5 is a raster diagram for illustrating the manner of scanning in a display apparatus used in the embodiment shown in FIG. 3.

The analog switch circuit 46 acts to convert the outputs of the N-channels, that is, the outputs of the buffer amplifiers 45-1 to 45-N into a time serial signal. When, for example, the method of scanning applied to a display apparatus 60 is similar to that used in a cathode-ray tube in a television receiver, a time serial signal is produced to suit such scanning method. Suppose now that the vertical scanning period is $T_R$ and the horizontal scanning period is $T$ as shown in FIG. 5. Then, the output signals of the buffer amplifiers 45-1 to 45-N are sequentially changed over at a period of $T_R/N = T_s$ within the time interval $T_R$ to obtain a time serial signal.

Figure 6:
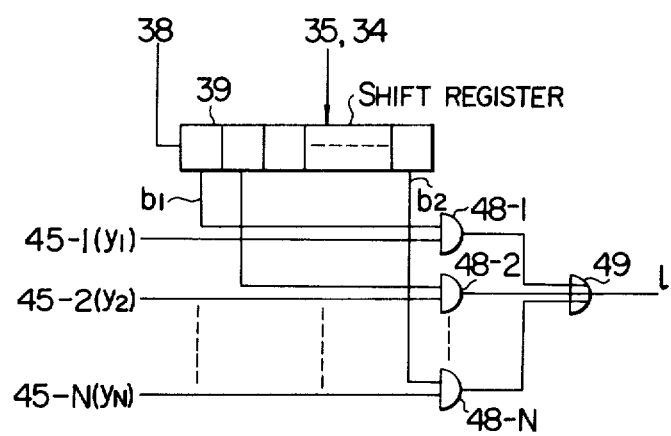
FIG. 6 is a diagram showing one form of an analog switch circuit 46 used in the embodiment shown in FIG. 3.
Figure 7:
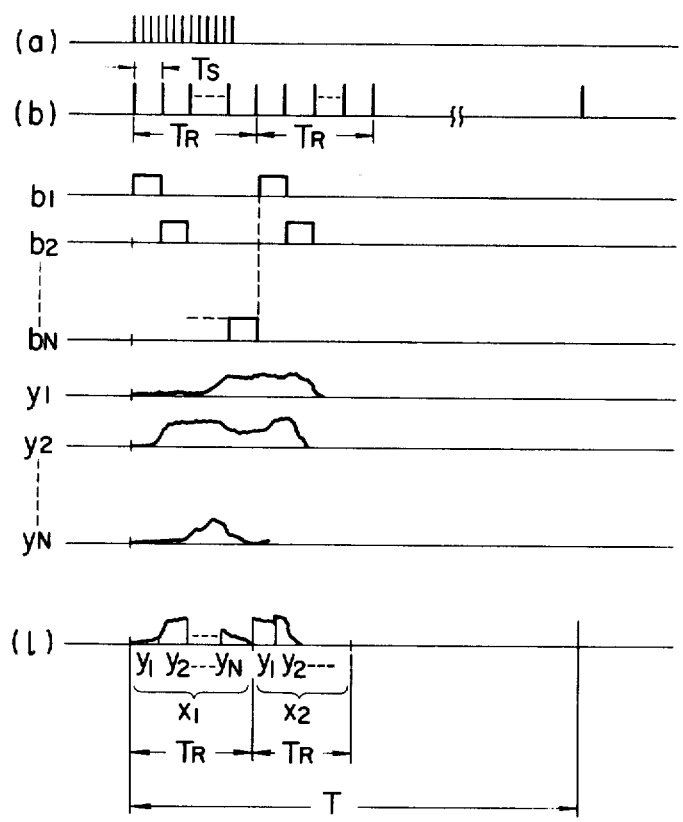
FIG. 7 is a time chart for illustrating the operation of the analog switch circuit shown in FIG. 6.

FIG. 6 shows the construction of the analog switch circuit 46 and FIG. 7 is a time chart for illustrating the operation of this analog switch circuit 46. Referring to FIG. 6, a shift register 39 is connected to a counter 38 shown in FIG. 3. Output pulses as shown in (b) of FIG. 7 appear from the counter 38 at a time interval of $T_s$ to be applied to the shift register 39, and the position of "1" in the shift register 39 is successively shifted by the pulse output of the counter 38. Shift register outputs $b_1, b_2, \ldots b_N$ are applied to respective analog gates 48-1, 48-2, ... 48-N to trigger these gates. Output signals $y_1, y_2, \ldots y_N$ of the buffer amplifiers 45-1, 45-2, ... 45-N are also applied to these analog gates 48-1, 48-2, ... 48-N respectively to appear from these gates when the gates are triggered. The outputs of the respective analog gates 48-1, 48-2, ... 48-N are combined by a combining circuit 49 to obtain a time serial signal as shown in (l) of FIG. 7 in which it will be seen that the output signals $y_1, y_2, \ldots y_N$ of the respective buffer amplifiers 45-1, 45-2, ... 45-N are changed over at the period $T_s$. In (l) of FIG. 7, $x_1, x_2, \ldots$ designate the signals obtained at individual positions in the direction of X-axis of one target plane, and $y_1, y_2, \ldots y_N$ designates the signals obtained at individual positions in the direction of Y-axis of the target plane. The time at which the output $b_1$ appears is determined by the set pulse delivered from the delay circuit 35 shown in FIG. 3, and similarly, the operation is completed in response to the appearance of the reset pulse from the counter 34. While the above description has referred to a time serial signal obtained by acoustic waves reflected from one target plane, it is apparent that time serial signals corresponding to the result of scanning on the respective target planes 6-1, 6-2, ... 6-M of different depths can be obtained in response to the successive application of the local oscillation signals 1, 2, ... 8 shown in (h) of FIG. 4 to the frequency analyzer 40.

In the embodiment above described, circuit elements corresponding to N channels are arranged in parallel to form the frequency analyzer 40, and the analog switch circuit 46 is connected to the frequency analyzer 40 to convert the outputs of the N-channels into a time serial signal. However, the position of the analog switch circuit 46 is in no way limited to that shown in FIG. 3 and the analog switch circuit 46 may be disposed between the band-pass filters 43 and the envelope detectors 44 or between the frequency converters 42 and the band-pass filters 43 and the output side thereof may comprise a single channel.

Referring to FIG. 3 again, the output of the analog switch circuit 46 is applied through a buffer amplifier 47 to another analog switch circuit 51. To this analog switch circuit 51, the pulse signal having the period $T + \Delta T$ shown in (g) of FIG. 4 is applied from the counter 31 so that the analyzed output signals of the frequency analyzer 40 can be sequentially changed over in response to the sequential change-over of the steps thereby discriminating the signals from the individual target planes. These signals are applied to a color matrix circuit 52. In the color matrix circuit 52, the signals corresponding to the individual distances are converted into different color signals previously selected for the individual distances. These color signals are applied to a display apparatus such as a color cathode-ray tube 60 so that the reflected image patterns classified by colors depending on the distances in the depthwise direction can be displayed on the screen of the color cathode-ray tube 60.

The allotment of colors indicative of the different distances may, for example, be similar to a method of color arrangement employed in a map. In other words, red which is commonly called a prominent color may be used to indicate the nearest distance and blue which is commonly called an unobtrusive color may be used to indicate the remotest distance to provide a color arrangement ranging from red to blue through green.

A three-dimensional reflected image of a target object can be obtained by displaying the vertical positions of the target object in the vertical direction of the screen, displaying the horizontal positions of the target object in the horizontal direction of the screen and displaying the depthwise positions of the target object by different colors. In lieu of the colors, the depthwise positions of the target object may be discriminated by different brightness levels.

Suppose that the channel change-over period is 1 $\mu$s, the number $N_R$ of members constituting the receiving transducer 5 is 100, the number N of channels of the frequency analyzer 40 is 100, and the number M of steps in the depthwise direction or the kind of colors is 8. Then, the period of time $T_F$ required for giving one three-dimensional display is $$T_F = T_C \cdot N_R \cdot N \cdot M = 2 \times 100 \times 100 \times 8 \ \mu s = 160 \ ms$$

Therefore, the image pick-up speed is about six frames per second. This speed can be increased if the channel change-over rate is increased so far as the switching speed of the analog switch circuit 51 allows. Further, although the embodiment above described has referred to the case in which the frequency of the signal applied to the transmitting transducer varies linearly relative to time, this frequency may be varied stepwise or in a quadratic fashion.

It will be understood from the foregoing detailed description of the present invention that the configuration such as the contour of a target object existing in muddy water can be reliably detected regardless of the situation and distance of the target object. (However, when an acoustic lens is disposed in front of the transmitting transducer, this distance must lie within the depth of the focus of the lens.) Thus, the present invention is remarkably advantageous among others over the prior art two-dimensional imaging system in that the efficiency of operation can be improved and the increased safety can be ensured. The present invention will find a variety of applications including various construction works and surveys in, for example, sea water, medical applications for the detection of internal troubles of the human body which cannot be observed by light, or nondestructive testing.

We claim:

1. An ultrasonic imaging apparatus comprising a first signal source for repeatedly generating a plurality of times a voltage signal whose frequency varies relative to time within a predetermined period of time, a transmitting transducer driven by the output of said first signal source for radiating ultrasonic waves whose direction of radiation varies in one direction depending on the frequency of the output of said first signal source, a receiving transducer divided into a plurality of members in a direction substantially orthogonal to the direction of variation of said ultrasonic waves, a second signal source for generating a plurality of repeated signals which correspond respectively to the individual repeated signals generated by said first signal source and appear at times delayed by different delay times relative to the respective repeated signals generated by said first signal source, a frequency analyzer for carrying out frequency analysis in response to the application of the output of said receiving transducer and the output of said second signal source thereby converting the received acoustic waves into signals representing the relative intensity of the received acoustic waves, a display signal generator for converting the output signals of said frequency analyzer into display signals, and an image display unit for displaying the output signals of said display signal generator.

2. An ultrasonic imaging apparatus as claimed in claim 1, wherein said first signal source is a generator of a saw-tooth wave signal having a predetermined period.

3. An ultrasonic imaging apparatus as claimed in claim 2, wherein said frequency analyzer is composed of a plurality of parallel circuits each having a frequency converter, a band-pass filter and an envelope detector connected in series in the above order, said frequency converters being respectively connected to the outputs of the corresponding members constituting said receiving transducer, the output of said second signal source being applied in common to said frequency converters, and the outputs of said envelope detectors are applied to an analog switch circuit which changes over periodically the output signals of said envelope detectors to convert such output signals into time serial signals.

4. An ultrasonic imaging apparatus as claimed in claim 3, wherein said display signal generator is changed over in synchronism with the output of said second signal source to convert the time serial signals into different color signals, and said image display unit is a color cathode-ray tube.

5. An ultrasonic imaging apparatus as claimed in claim 4, wherein the time interval between the individual signals repeatedly generated by said first signal source is equal to the horizontal or vertical scanning period of said cathode-ray tube, and the change-over period of said envelope detectors is equal to the vertical or horizontal scanning period of said cathode-ray tube.

6. An ultrasonic imaging apparatus as claimed in claim 1, wherein said frequency analyzer is composed of a plurality of parallel circuits each having a frequency converter and a band-pass filter connected in series in the above order, said frequency converters being respectively connected to the outputs of the corresponding members constituting said receiving transducer, the output of said second signal source being applied in common to said frequency converters, and said band-pass filters are connected to an analog switch circuit which changes over periodically the output signals of said band-pass filters to convert such output signals into time serial signals, the output of said analog switch circuit being applied to a single band-pass filter.

7. An ultrasonic imaging apparatus as claimed in claim 6, wherein the output of said first signal source is a saw-tooth wave signal having a predetermined period.

8. An ultrasonic imaging apparatus as claimed in claim 1, wherein said first signal source is composed of a clock pulse generator, a first counter for counting the clock pulses generated from said clock pulse generator thereby delivering an output pulse in each period of the output of said first signal source, a saw-tooth wave generator triggered by the output of said first counter, and an oscillator for converting the saw-tooth wave voltage signal generated from said saw-tooth wave generator into a saw-tooth wave frequency signal, and said second signal source is composed of a second counter for counting the clock pulses generated from said clock pulse generator thereby delivering an output pulse in each period of the output of said first signal source, a delay circuit for delaying the output of said second counter by a predetermined period of time, a third counter triggered by the output of said delay circuit for delivering output pulses having a predetermined time interval therebetween, a saw-tooth wave voltage signal generator triggered by the output of said third counter, and a voltage controlled oscillator for converting the saw-tooth wave voltage signal generated from said voltage signal generator into a saw-tooth wave frequency signal.

* * * * *